United States Patent [19]

Losada

[11] Patent Number: 5,178,503
[45] Date of Patent: Jan. 12, 1993

[54] FASTENER ASSEMBLY HAVING FLAT SURFACE FOR STABILIZING THE BARREL OF A POWER ACTUATED GUN

[76] Inventor: Al Losada, 204 Folino Dr., Bridgeport, Conn. 06606

[21] Appl. No.: 840,402

[22] Filed: Feb. 24, 1992

Related U.S. Application Data

[63] Continuation-in-part of Ser. No. 694,934, May 2, 1991, Pat. No. 5,110,247.

[51] Int. Cl.$^5$ .................. F16B 15/00; B25C 1/08; B25C 5/02; B25C 5/06
[52] U.S. Cl. ..................... 411/441; 411/480; 411/485; 227/9; 227/124; 227/147; 248/547
[58] Field of Search ............... 411/440, 441, 461, 469, 411/480, 485; 248/71, 300, 301, 547; 227/9, 119, 124, 147

[56] References Cited

U.S. PATENT DOCUMENTS

| | | | |
|---|---|---|---|
| 2,961,210 | 11/1960 | Pfaff et al. | 248/71 |
| 3,452,637 | 7/1969 | O'Brien | 411/439 |
| 3,638,892 | 2/1972 | Boye et al. | 227/9 |
| 4,102,238 | 7/1978 | Thurner | 411/441 |
| 4,655,423 | 4/1987 | Schavilje et al. | 248/547 |
| 4,703,883 | 11/1987 | Losada | 248/547 X |
| 4,736,923 | 4/1988 | Losada | 248/547 |
| 4,932,819 | 6/1990 | Almeras | 411/441 |

FOREIGN PATENT DOCUMENTS

| | | | |
|---|---|---|---|
| 1603703 | 9/1970 | Fed. Rep. of Germany | 411/441 |
| 2504816 | 8/1975 | Fed. Rep. of Germany | 411/441 |

*Primary Examiner*—Neill R. Wilson
*Attorney, Agent, or Firm*—Paul A. Fattibene; Arthur T. Fattibene

[57] ABSTRACT

A fastener assembly for use with a power actuated gun including a bracket and associated stud wherein the bracket is formed with at least two fingers extending upward therefrom. The fingers are formed so as to permit the fastener assembly to be frictionally held within the bore of the power actuated gun. The support for the studs and fingers are configured to readily collapse when the stud is driven into a support structure, causing the head end portion of the stud to be made flush against the bracket and causing the fingers to occupy the space from whence they were formed. Another embodiment has a flat surface on a curved bracket to assist in stabilizing the barrel of a power actuated gun.

3 Claims, 3 Drawing Sheets

FASTENER ASSEMBLY HAVING FLAT SURFACE FOR STABILIZING THE BARREL OF A POWER ACTUATED GUN

RELATED PATENT APPLICATION

The present application is a continuation-in-part application of co-pending U.S. patent application Ser. No. 07/694,934 filed May 2, 1991, issuing as U.S. Pat. No. 5,110,247 on May 5, 1992.

FIELD OF THE INVENTION

The present invention relates generally to mechanical fasteners, and more specifically to an improved power driven fastener.

BACKGROUND OF THE INVENTION

There are many fasteners designed to be driven by a power actuated gun. These fasteners are used in the construction trades and building industries for supporting and holding pipes, cables, and various other devices. Typically, these fasteners must be driven into stone, brick, or masonry walls. For this reason, power actuated guns have been developed for forcing the fastener into the wall.

One such fastener is disclosed in U.S. Pat. No. 3,452,637 issuing on Jul. 1, 1969 to O'Brien and entitled "Fastener and Attachment Therefor". Therein disclosed is a fastener assembly having a tubular body portion with a flange. A plurality of fingers extend outwardly toward the pointed end of a fastener. The fingers frictionally retain the fastener within the muzzle portion of a tool. Another fastener assembly is disclosed in U.S. Pat. No. 4,703,883 issued on Nov. 3, 1987 to Losada and entitled "Fastener Assembly". Therein disclosed is a fastener assembly for use with a power actuated fastener gun having a plate forming a depression that is disposed out of the plane of the bearing portion of the fastener. A stud having a pointed end is frictionally retained in the plate so that the pointed end of the stud does not extend below the bearing surface of the plate.

While these and other fasteners have proven useful in many applications, they are not without their inconveniences. While the fastener disclosed in O'Brien can be held within the bore of an actuating tool, there is no bracket or plate from which other devices can be attached. Additionally, the tubular body portion including the downwardly pointed fingers, tends to cause the head of the fastener to protrude from the work surface. The fastener assembly disclosed in O'Brien is also relatively complex and difficult to make inexpensively. Typically, due to the number of fastener assemblies manufactured, any small improvement in design resulting in a small savings in manufacturing costs is extremely beneficial. The fastener assembly disclosed in Losada, while improving the cooperation with the power actuated fastener gun, and facilitating inexpensive manufacture, cannot be easily frictionally retained within the barrel portion of the power actuated gun.

Therefore, there is a need for an improved fastener that can be easily held within a power actuated gun that forms a part of a holding device that does not cause the head of the fastener to protrude from the work surface. There is also the need for improving, however slight, the ease in which fastener assemblies are manufactured.

SUMMARY OF THE INVENTION

The present invention comprises a fastener assembly having a bracket or plate providing a large bearing surface and a means to attach other devices. At least two fingers are formed by a portion of the bracket or plate. The fingers are positioned to provide a friction fit in the barrel of a power actuated gun. The distal end of the fingers are pointed upward toward the head of the stud fastener. This causes the fingers to spread when the head of the stud is driven downward by the power actuated gun. This permits the head of the stud to lay flatter. Therefore, the head does not protrude unnecessarily from the workpiece. The fingers, being formed from the bracket or plate, facilitate manufacture. In another embodiment, a rounded bracket has a laterally extending flat surface for helping to stabilize the barrel of a power actuated gun.

Accordingly, it is an object of the present invention to provide a fastener assembly that can be frictionally held in the bore of a power actuated gun.

It is a further object of the present invention to provide a structure that permits the head of a fastener or a stud to lay as flat as possible after being driven in the work surface.

It is an advantage of the present invention that the fastener is easy to manufacture, and therefore, less expensive.

It is a further advantage of the present invention that the fingers are forced away from the shank by the fastener head when the fastener is driven into a wall.

It is yet another advantage of the present invention that the barrel of a power actuated gun can be stabilized on a rounded bracket.

It is a feature of the present invention that the fingers formed by a portion of the bracket or plate point up toward the head of the fastener.

It is another feature of the present invention that the fingers are formed from a portion of the bracket or plate.

It is yet another feature of the present invention that the top surface of a rounded bracket has a laterally extending flat surface.

These and other objects, advantages, and features will become readily apparent in view of the following more detailed description.

DETAILED DESCRIPTION OF THE PREFERRED EMBODIMENTS

Figure 1:
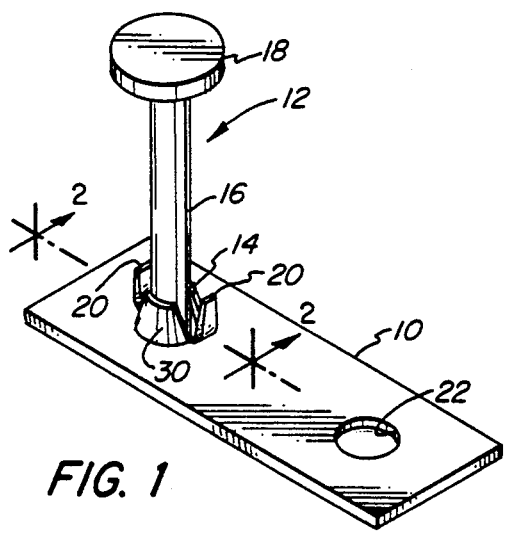
FIG. 1 is a perspective view of one embodiment of the present invention.

FIG. 1 illustrates one embodiment of the present invention. The present invention is an assembly comprised of a bracket or plate 10 and a stud or fastener 12. The bracket or plate 10 has an aperture 14 therein. The shank 16 of stud 12 has a diameter of a size to provide a friction fit with aperture 14. Thereby, the stud 12 is held in position perpendicular to bracket or plate 10. Bracket 10 is provided with a hole 22 therein so that bracket 10 can be used as a means for fastening another device, as is common in the construction industry. On bracket 10 are formed support sides 30. The support sides 30 are formed from the bracket plate 10 and help support the shank 16 of stud 12. Aperture 14 is formed by the support sides 30, through which the shank 16 of stud 12 is frictionally placed. Thereby, after assembly, the bracket 10 and the stud 12 are held together.

Figure 2:
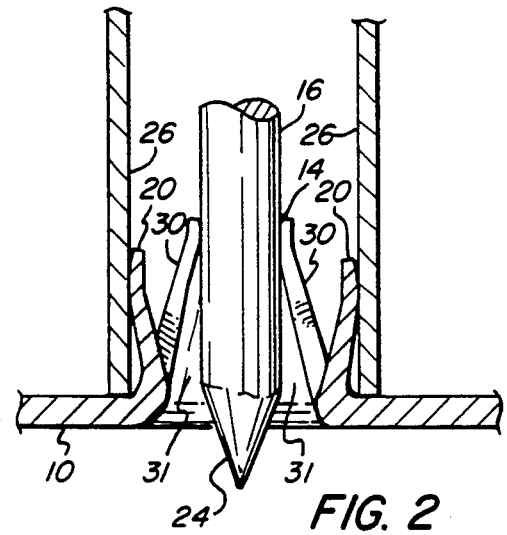
FIG. 2 is a cross section taken along line 2—2 in FIG. 1 with the bore of a power actuated gun included.

FIG. 2 more clearly illustrates this embodiment of the present invention. The cross section of a bore of a power actuated gun 26 has been added to more clearly illustrate the operation of the present invention. From the bracket 10 are formed support sides 30 and fingers 20. The pointed end portion 24 of the stud 12, illustrated in FIG. 2, is placed through aperture 14. A friction fit is provided, securely holding the shank 16 onto bracket 10. The bore 26 of a power actuated gun is placed around fingers 20. The fingers 20 help retain the bracket 10 and stud 12 within the power actuated gun so that the fastener can be positioned easily prior to being fastened by the power actuated gun. As the stud 12 is driven down, the head end portion 18, illustrated in FIG. 1, will force the support sides 30 filling in gap 31, providing a tight fit with shank 16. The upwardly extending fingers 20 will be forced outward by the head end portion 18, illustrated in FIG. 1. Therefore, the head end portion 18 will rest flatter adjacent bracket 10 after being driven by the power actuated gun. The fingers 20 thus function as a means for retaining the bracket assembly within the bore of the power gun by frictional resistance between the fingers 20 and the gun bore 26. Thus, even when the gun bore is pointed in a downward position, the bracket assembly can be positively retained to the gun bore.

Figure 3:
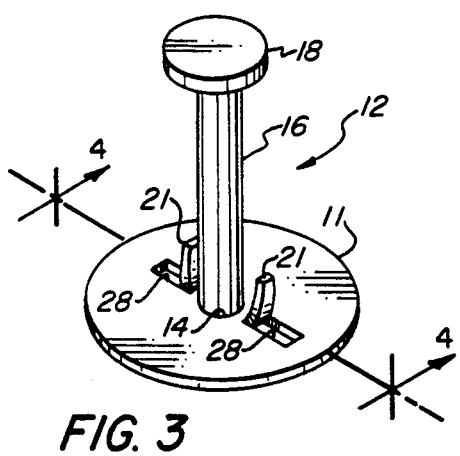
FIG. 3 is a perspective view of a second embodiment of the present invention.
Figure 4:
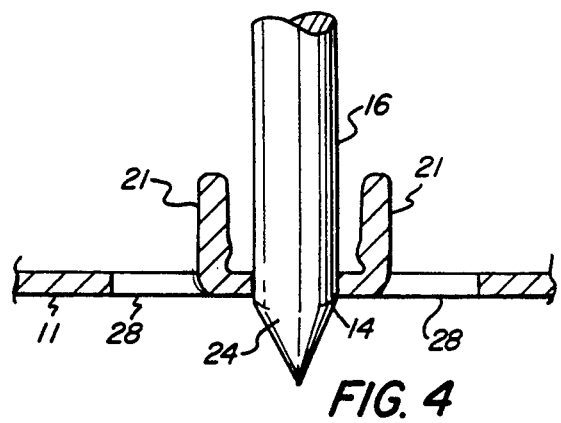
FIG. 4 is a cross section taken along line 4—4 in FIG. 3.

FIG. 3 illustrates a second embodiment of the present invention. In FIG. 3, shank 16 of the stud 12 is positioned through aperture 14 of bracket 11 and frictionally held into position thereon. Formed within circular bracket 11 are fingers 21. Fingers 21 are formed or blanked out of the surface of circular bracket 11 This can conveniently be done by a simple and economical stamping operation. Openings 28 remain after the fingers 21 are formed. It can easily be seen from FIG. 4 that the bore of a power actuated gun, not illustrated, is positioned around the fingers 21 similarly to the fingers illustrated in FIG. 2. Thereby, the fastener assembly illustrated in FIG. 4 is frictionally held in place within the bore of an actuated gun, not illustrated, prior to being driven, even if the bore of the gun is pointed in a downward position. With reference to FIGS. 3 and 4, it can readily be appreciated that upon stud 12 being driven, the head end portion 18 will be forced downward into contact with the upwardly extending fingers 21. Because the fingers 21 extend upward when the head end portion 18 is driven down, the fingers 21 will be driven outward away from the shank 16. This results in the head end portion 18 resting against the surface of the bracket 13 without unnecessarily protruding from bracket 11 after being driven, and causing the fingers 21 into the area of the opening 28.

Figure 5:
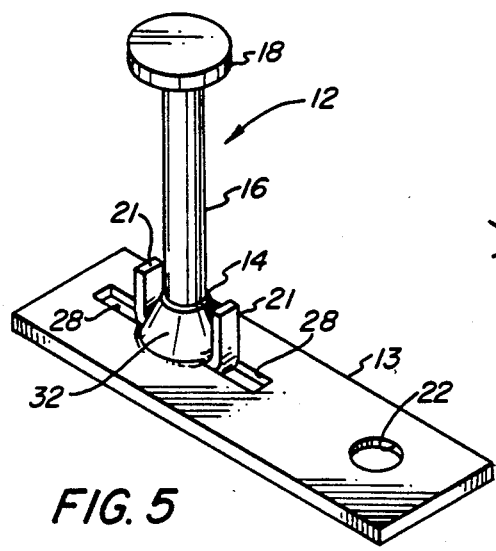
FIG. 5 is a perspective view of a third embodiment of the present invention.

FIG. 5 illustrates a third embodiment of the present invention. Formed within bracket 13 is a support cone 32. Support cone 32 is similar to the support sides 30 illustrated in FIG. 1 with the exception that the fingers 20 are not formed therein. Instead, fingers 21 are formed from the planer surface of bracket 13. Therefore, the support cone 32 having a space similar to gap 31 illustrated in FIG. 2, will be filled in when the stud 12 is driven downward. Similar to the embodiment illustrating FIG. 3, the fingers 21 of FIG. 5 will be forced outward by head end portion 18 and into openings 28 resulting in the head end portion 18 having a better contact with bracket 13, as well as not unnecessarily protruding therefrom.

Figure 6:
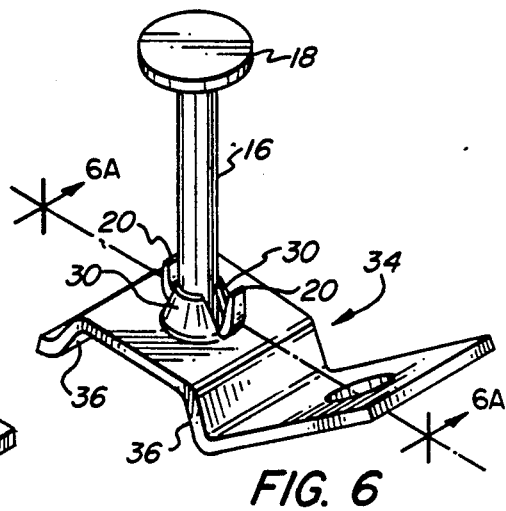
FIG. 6 is a perspective view of a fourth embodiment of the present invention.
Figure 6A:
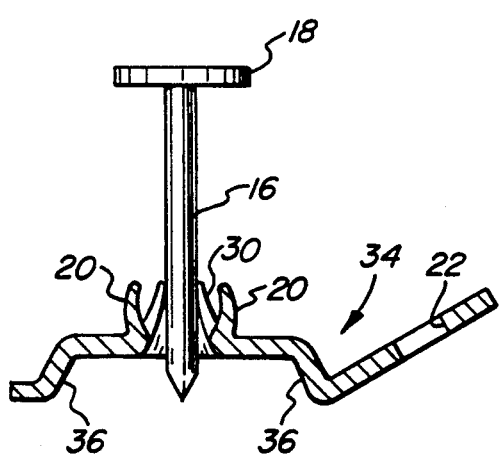
FIG. 6A is a cross section along line 6A—6A in FIG. 6.

FIG. 6 illustrates a fourth embodiment of the present invention formed from a non-planer bracket 34. The non-planer bracket 34 has angled legs 36 which permit the point of stud 16 to be positioned above the work surface in which the stud 12 is to be driven. As illustrated in FIG. 6A, the non-planer bracket 34 and angled legs 36 form in longitudinal cross section one-half of a polygon.

Figure 7:
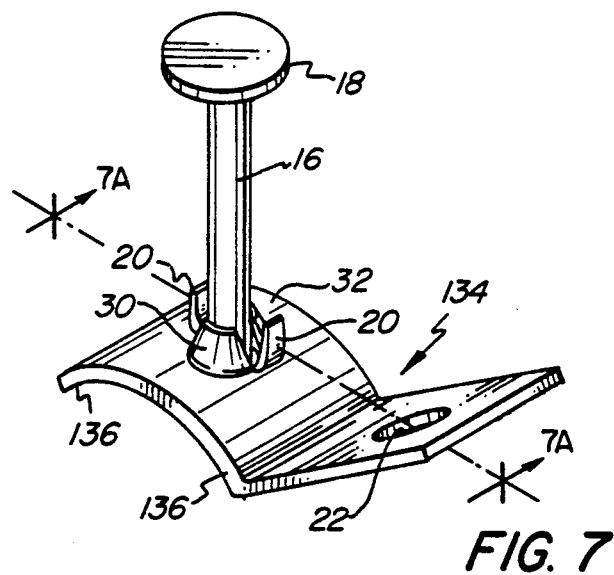
FIG. 7 is a perspective view of a fifth embodiment of the present invention.
Figure 7A:
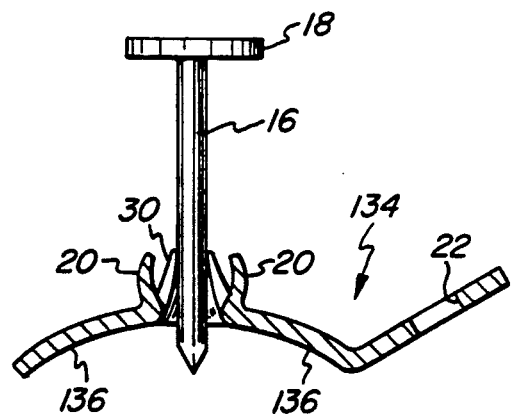
FIG. 7A is a cross section along line 7A—7A in FIG. 7.

FIG. 7 illustrates another embodiment of the present invention. In FIG. 7, a non-planer bracket 134 is shown. Nonplaner bracket 134 has rounded legs 136. Therefore, as illustrated in FIG. 7A, in longitudinal cross section, bracket 134 has the shape of a semi-circle or oval. Resultingly, in the embodiment illustrated in FIG. 7, the invention has a smooth, continuous curve, in contrast to the more linear and angular embodiment illustrated in FIG. 6.

As shown, the brackets 10, 11, 13, 34 and 134 provide support for a stud 12. Blanked out of a portion of the brackets 10, 11, 13, 34 and 134 are fingers 20, 20 that are laterally spread to allow the bracket assembly to be frictionally retained within the bore of a power gun 26 in FIG. 2. In other respects, the brackets 10, 11, 13, 34 and 134 are constructed as described in my prior issued patent, U.S. Pat. No. 4,736,923 granted Apr. 12, 1988, which is herein incorporated by reference.

Figure 8:
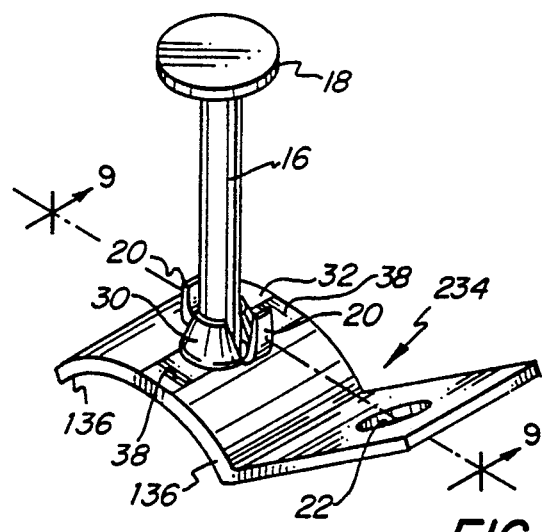
FIG. 8 is a perspective view of a sixth embodiment of the present invention.
Figure 9:
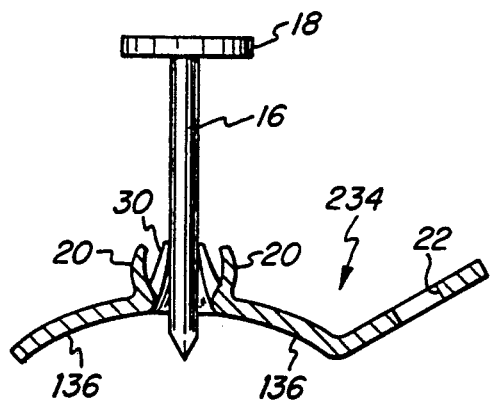
FIG. 9 is a cross section taken along line 9—9 in FIG. 8.

FIGS. 8 and 9 illustrate a sixth embodiment of the present invention. In FIG. 8, a bracket 234 is illustrated. Bracket 234 is similar to the bracket illustrated in FIGS. 7 and 7A, with the exception that bracket 234 illustrated in FIGS. 8 and 9 has a flat 38 on the top surface thereof. This flat surface 38 is located on the topmost portion adjacent the shaft 16. The flat surface 38 performs the function of helping to stabilize the barrel (not shown) of a power actuated gun. In operation, the barrel (not shown) of a power actuated gun would fit over the head 18 and shaft 16 and rest on a portion of the bracket between support sides 30 and the longitudinal edge of the bracket 234. This flat 38 greatly facilitates the use of bracket 234, which has a rounded top surface, with a power actuated gun. Due to the flat 38, a larger portion of the top surface of bracket 234 comes into contact with the end of a barrel of a power actuated gun.

Figure 10:
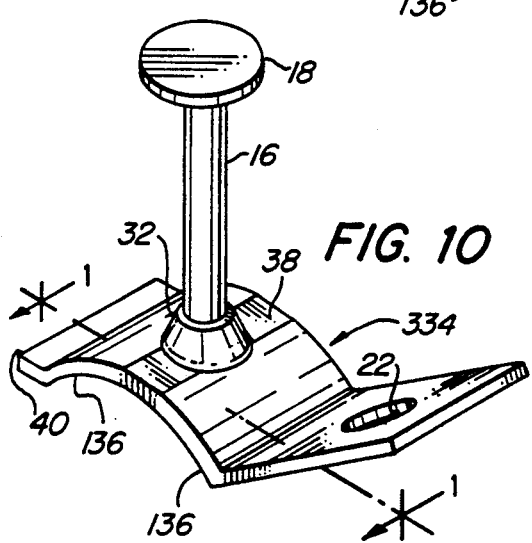
FIG. 10 is a perspective view of a seventh embodiment of the present invention.
Figure 11:
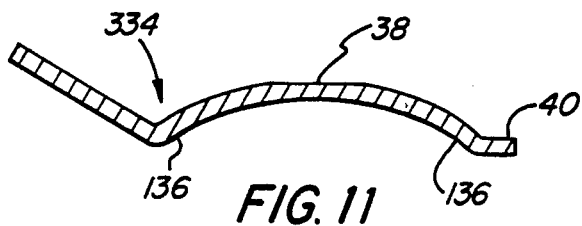
FIG. 11 is a cross section taken along line 11—11 in FIG. 10.

FIGS. 10 and 11 illustrate a seventh embodiment of the present invention. FIG. 10 illustrates a bracket 334, similar to that illustrated in FIGS. 8 and 9. However, bracket 334, illustrated in FIGS. 10 and 11, has a support cone 32 similar to that illustrated in FIG. 5. Additionally, bracket 334 has a stabilization leg 40 extending from one of the rounded legs 136. FIG. 11 more clearly illustrates the flat 38 on the top surface of the rounded bracket 334.

With reference to FIGS. 1—11, it should now be readily appreciated that the present invention provides an improved fastener assembly that permits easy manufacture and ease of operation that, when driven, results in a head that does not unnecessarily protrude from the bracket. The fingers blanked out of the plane of the bracket also serve to frictionally retain the assembly within the bore of the gun.

While several embodiments have been illustrated and described, it should be clear that the various features can be combined and mixed with different brackets providing the benefits of the present invention. Therefore, it will be obvious to those skilled in the art that various modifications may be made without departing from the spirit and scope of this invention.

What is claimed is:

1. An improved fastener assembly of a type which is driven into a support structure by a power actuated gun comprising:
    a bracket, a portion of said bracket having a longitudinal cross section that is substantially continuously curved, the top surface of said bracket having a flat portion;
    support sides extending from said bracket in a cone shape adjacent the flat portion, said support sides having an aperture therein;
    a stud having a head end portion, a shank, and a pointed end portion, said shank having a diameter to frictionally fit within said aperture, said support sides and said shank forming a gap extending from said aperture and widening to the surface of said bracket when said pointed end portion is placed in said aperture, and
    a pair of opposed fingers blanked out of said support sides; said fingers having the distal ends thereof extending up toward the smaller open end of said support sides, whereby said at least two fingers are laterally spread away from said shank to frictionally retain said fastener assembly in the bore of a gun.

2. An improved fastener assembly of a type which is driven into a support structure by a power actuated gun comprising:
    a bracket;
    a portion of said bracket having a longitudinal cross section that is substantially continuously curved, the top surface of said bracket having a flat portion;
    support sides extending from said bracket in a cone shape adjacent the flat portion, said support sides having an aperture therein; and
    a stud having a head end portion, a shank, and a pointed end portion, said shank having a diameter to frictionally fit within said aperture, said support sides and said shank forming a gap extending from said aperture and widening to the surface of said bracket when said pointed end portion is placed in said aperture.

3. An improved fastener assembly as in claim 2:
    further comprising a stabilizing leg extending from one end of said bracket.

* * * * *